US011980514B2

(12) United States Patent
Whitman et al.

(10) Patent No.: US 11,980,514 B2
(45) Date of Patent: May 14, 2024

(54) FLOSSING APPARATUS

(71) Applicant: NoPo Kids Dentistry, Portland, OR (US)

(72) Inventors: Anastacia Whitman, Portland, OR (US); Steven Dodson, Gresham, OR (US)

(73) Assignee: DOCTOR STACI, LLC, Portland, OR (US)

(*) Notice: Subject to any disclaimer, the term of this patent is extended or adjusted under 35 U.S.C. 154(b) by 206 days.

(21) Appl. No.: 17/079,296

(22) Filed: Oct. 23, 2020

(65) Prior Publication Data
US 2021/0121273 A1    Apr. 29, 2021

Related U.S. Application Data

(60) Provisional application No. 62/925,110, filed on Oct. 23, 2019.

(51) Int. Cl.
*A61C 15/04* (2006.01)

(52) U.S. Cl.
CPC ................................. *A61C 15/046* (2013.01)

(58) Field of Classification Search
CPC ... A61C 15/046; A61C 15/047; A61C 15/048; A61C 15/02; A61C 15/04
See application file for complete search history.

(56) References Cited

U.S. PATENT DOCUMENTS

| | | | | |
|---|---|---|---|---|
| 2,180,522 A * | 11/1939 | Henne | .................. | A61C 15/046 D28/66 |
| 3,918,466 A * | 11/1975 | Peebles, Jr. | .......... | A61C 15/046 132/323 |
| 3,926,201 A * | 12/1975 | Katz | .................... | A61C 15/046 264/157 |
| 4,006,750 A * | 2/1977 | Chodorow | .......... | A61C 15/046 264/251 |
| 4,655,233 A * | 4/1987 | Laughlin | .............. | A61C 15/046 D28/68 |
| 4,693,365 A * | 9/1987 | Corella | ................ | A61C 15/043 206/390 |
| 4,712,572 A | 12/1987 | Hovel, III | | |
| 4,729,392 A * | 3/1988 | Tenny | ................. | A61C 15/046 132/323 |

(Continued)

FOREIGN PATENT DOCUMENTS

EP           3964166 A1 *   3/2022

OTHER PUBLICATIONS

European Patent Office, "European search report," issued in connection with European Patent Application No. 20879820 dated Oct. 19, 2023 (8 pages).

*Primary Examiner* — Heidi M Eide
*Assistant Examiner* — Lina Faraj
(74) *Attorney, Agent, or Firm* — HOLLAND & HART LLP

(57) ABSTRACT

A flossing apparatus includes a handle assembly and a filament. The handle assembly includes first and second composite cores and first and second arms. The first composite core has at least one paper layer and at least one biodegradable plastic layer, and the second composite core has at least one paper layer and at least one biodegradable plastic layer. The filament is mounted to the first and second arms and captured between the first composite core and the second composite core.

18 Claims, 6 Drawing Sheets

(56) References Cited

U.S. PATENT DOCUMENTS

| | | | | | |
|---|---|---|---|---|---|
| 4,807,752 | A * | 2/1989 | Chodorow | A61C 15/043 | 206/820 |
| 5,014,725 | A * | 5/1991 | Patscot | A61C 15/046 | 132/324 |
| 5,246,021 | A * | 9/1993 | Katz | A61C 15/046 | 132/323 |
| 6,096,431 | A * | 8/2000 | Matsudaira | G06K 19/02 | 360/2 |
| 8,663,520 | B2 * | 3/2014 | Kalbfeld | A46B 1/00 | 264/250 |
| 8,883,295 | B2 * | 11/2014 | Lee | G09F 15/02 | 442/164 |
| 9,150,004 | B2 * | 10/2015 | Dou | B32B 27/16 | |
| 9,314,999 | B2 * | 4/2016 | Cloutier | C23C 14/24 | |
| 9,492,962 | B2 * | 11/2016 | Dou | B29C 48/08 | |
| 2008/0257378 | A1 * | 10/2008 | Jansheski | A61C 15/046 | 362/109 |
| 2009/0151747 | A1 * | 6/2009 | Bush | A61C 15/043 | 132/324 |
| 2009/0235951 | A1 * | 9/2009 | LeGrande | A61C 15/043 | 132/321 |
| 2009/0312462 | A1 * | 12/2009 | Oakley | B29C 48/09 | 524/47 |
| 2010/0294294 | A1 * | 11/2010 | Wu | A61K 8/19 | 132/200 |
| 2010/0297575 | A1 * | 11/2010 | Effenberger | A61C 19/063 | 132/329 |
| 2011/0132392 | A1 * | 6/2011 | Crisp | A46B 15/0073 | 132/309 |
| 2012/0085365 | A1 * | 4/2012 | Cielo | A61C 15/046 | 132/323 |
| 2015/0297326 | A1 * | 10/2015 | Amron | A61C 15/043 | 132/323 |
| 2016/0039176 | A1 * | 2/2016 | Weinberg | B44C 5/04 | 296/191 |
| 2016/0046105 | A1 * | 2/2016 | Markowski | B32B 7/12 | 156/60 |
| 2016/0067021 | A1 * | 3/2016 | Zwimpfer | A61C 15/02 | 425/542 |
| 2016/0113744 | A1 * | 4/2016 | Chodorow | A61C 15/02 | 264/138 |
| 2016/0278894 | A1 * | 9/2016 | Xu | A61C 15/046 | |
| 2017/0156830 | A1 * | 6/2017 | Wallace | A61C 15/046 | |
| 2019/0388202 | A1 * | 12/2019 | Battaglia | A61C 15/048 | |
| 2022/0079727 | A1 * | 3/2022 | May | A61C 15/046 | |

* cited by examiner

FLOSSING APPARATUS

TECHNICAL FIELD

The present disclosure relates generally to flossing devices, and more particularly to single use flossing devices.

BACKGROUND

Plastic, single-use flossers have been in use for years. Some single-use flossers comprise bio-based plastics. Under optimal conditions, some types of bio-based plastics can biodegrade. The challenge with using such bio-based plastics is that the optimal conditions necessary for biodegradability are very rare. Additionally, the organisms that consume the bioplastics have to eat the plastic from the outside surface inward. In the case of typical single-use plastic flossers, the organisms would have to eat through about 0.06 inches (1/16th inch) of plastic, which could take decades or longer. Some existing single-use flossers also incorporate activated charcoal powder in the bioplastic. The use of such charcoal powder slows biodegradability because the charcoal is not a good environment for bacteria, resulting in the bacteria not thriving and consuming the bioplastic.

SUMMARY

The present disclosure is directed to flossing devices, and particularly to single use flossing devices. One aspect of the present disclosure relates to a flossing apparatus that includes a handle assembly and a filament. The handle assembly includes first and second composite cores and first and second arms. The first composite core has at least one paper layer and at least one biodegradable plastic layer, and the second composite core has at least one paper layer and at least one biodegradable plastic layer. The filament is mounted to the first and second arms and captured between the first composite core and the second composite core.

The at least one paper layer of the first and/or second composite cores may include recycled paper. The biodegradable plastic layer of the first and/or second composite cores may include at least one of polylactic acid (PLA), polybutylene adipate terephthalate (PBAT), polybutylene succinate (PBS), or poly-3-hydroxybutyrate (PHB) bioplastic. The biodegradable plastic layer of the first and/or second composite cores may include a biodegrading additive. The first composite core may have a thickness in the range of from about 0.005 inch to about 0.1 inch, and the second composite core may have a thickness in the range of from about 0.005 inch to about 0.1 inch. The first composite core may have at least 2 paper layers and at least 2 biodegradable plastic layers, and the second composite core may have at least 2 paper layers and at least 2 biodegradable plastic layers. The handle assembly may further include a third composite core having at least one paper layer and at least one biodegradable plastic layer. In some versions of the flossing apparatus, the first, second, and/or third cores may have identical or similar thicknesses. In others, the first, second, and/or third cores may have thicknesses which are independently selected from each other, and which may differ from each other independently. The handle assembly may further include a plant-based sealant. The filament may include a biodegradable material. The filament may include a naturally derived materials such as silk, or a recycled material. The handle assembly may have a maximum length in the range of from about 1 inch to about 4 inches. The first and second arms may be integrated into the first and second composite cores. The filament may be held in tension on the handle assembly.

In some embodiments, a single strand of filament is provided between the arms of the flossing apparatus. In others, more than one strand of filament is provided. In some, the strands of the more than one strand of filament abut each other. In still others, a gap of a specific size is provided between the strands of the more than one strand of filament. In some variants, the gap may be approximately 1 mm between the strands of filament. Filaments may be aligned along a plane of the flossing apparatus, along multiple parallel planes of the flosser, or they may be provided at angles to each other to enhance the cleaning ability of the flosser. The gap(s) between the more than one strand of filament may be varied within the scope of this disclosure. In some embodiments, two strands of filament may be placed between the arms of the flossing apparatus. In others, three or more strands of filament may be used. In some variants, the strands may cross or be wound around each other. In some exemplary embodiments, the filaments used are identical to each other in size and physical properties. In other, the filaments used may differ in thickness, coefficient of friction, and/other physical and/or chemical properties.

Another aspect of the present disclosure relates to a flossing apparatus that includes a handle assembly and a filament. The handle assembly includes multiple layers of paper and multiple layers of biodegradable plastic, and filament mounting members. The filament extends between and wraps around the filament mounting members, and the filament is captured between layers of the handle assembly.

Another aspect of the present disclosure relates to a method of making a flossing apparatus. The method includes forming a base handle member from a first laminate structure, the base handle member having first and second arms, and the first laminate structure having at least one layer of paper and at least one layer of biodegradable plastic. The method further includes forming a second laminate structure having at least one layer of paper and at least one layer of biodegradable plastic, securing a filament to the first and second arms, and securing the second laminate structure to the base handle member with the filament captured therebetween.

The method may also include applying a plant-based sealant to one or both of the base handle member and the second laminate structure. Securing the filament may include maintaining the filament in tension when secured to the first and second arms. Forming the second laminate structure may include cutting the second laminate structure into a predetermined shape having a profile that matches a profile of the base handle member. Forming the base handle member ma include cutting the base handle member from the first laminate structure.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 is a perspective view of an example flossing apparatus in accordance with the present disclosure.

DETAILED DESCRIPTION

Figure 1:
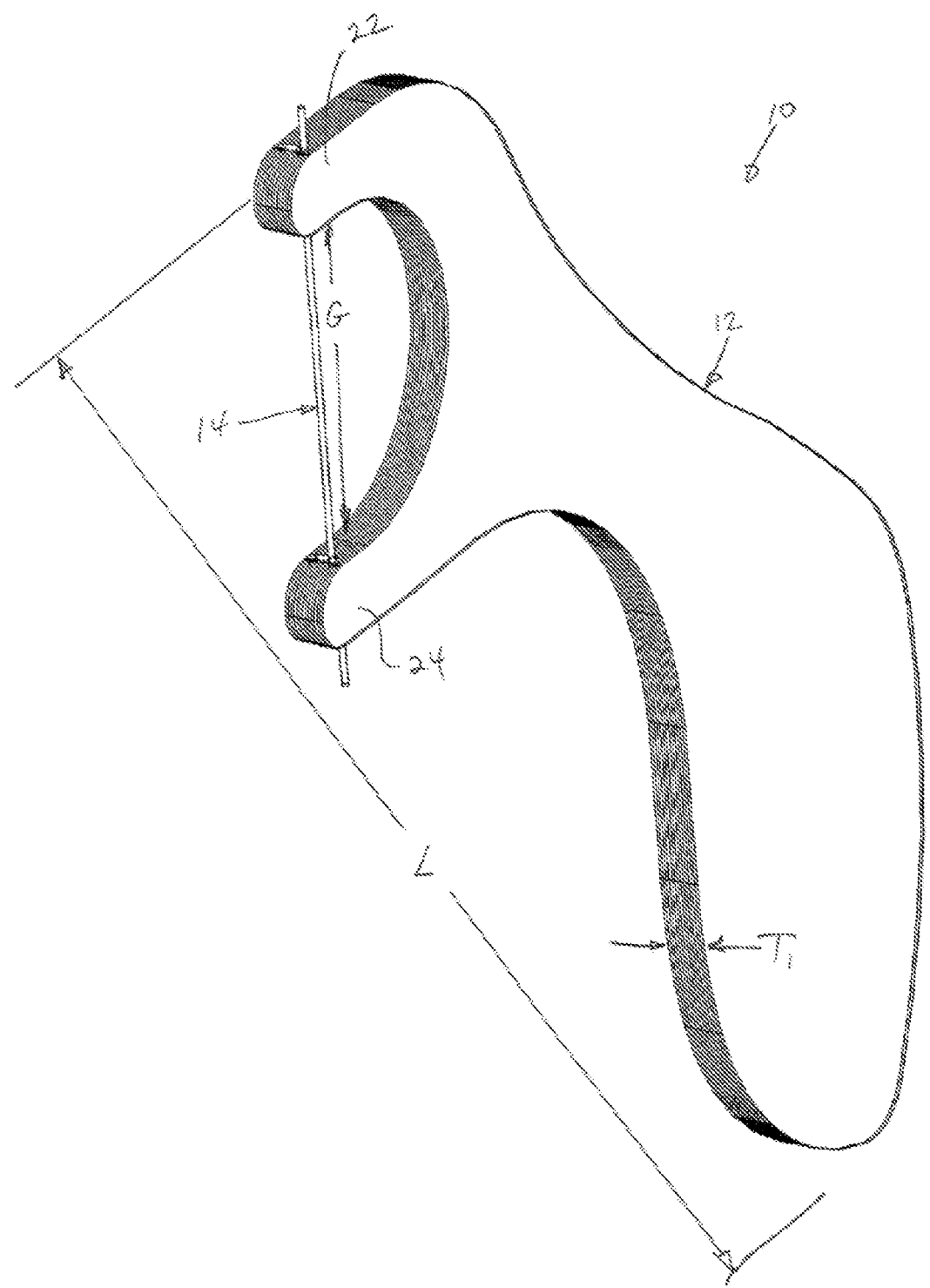

This description provides examples, and is not intended to limit the scope, applicability or configuration of the invention. Rather, the ensuing description will provide those skilled in the art with an enabling description for implementing embodiments of the invention. Various changes may be made in the function and arrangement of elements without altering the invention itself.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The present disclosure is directed to a flossing device that addresses some of the shortcomings of the prior art set forth above. The flossers disclosed herein may simultaneously reduce the amount of plastic, such as, in some embodiments, bio-plastic, in the flossing apparatus and make it much easier for the organisms that may consume the bio-plastic to access and consume the bio-plastic material. Some example bioplastics that may be suitable for use with the flossers disclosed herein polylactic acid (PLA), polybutylene adipate terephthalate (PBAT), polybutylene succinate (PBS), and poly-3-hydroxybutyrate (PHB). A variety of other bioplastics may also be suitable. In one example, the bioplastic includes PBS with a biodegradable additive to enhance bio-breakdown.

One aspect of the present disclosure is directed to a single-use flosser that comprises layers of paper laminated with layers of bioplastic. In some embodiments, the individual paper layers are thinner than the thickness of the individual bio-plastic layers. In one example, the individual paper layers are at least as thick as a thickness of the individual bio-plastic layers, and potentially twice as thick or more as the thickness of the bio-plastic layers. In some instances, this laminate construction may result in a significant reduction in the plastic content in the flosser, such as a reduction of up to or at least about one-half or more as compared to flossers that do not include one or more paper layers. Furthermore, the use of thin bio-plastic layers (i.e., in the range of about 0.001 inch to about 0.002 inch) in the laminate structure may make it possible for organisms to break down the bio-plastic much faster than the thicker layers of bio-plastic used in existing flossers.

The laminating process to secure the paper and bio-plastic layers together may involve the use of a variety of different types of materials and/or methods. One example includes the use of ultrasonic bonding. Other methods include the use of heat energy, pressure, bonding agents, and combinations thereof. The layers can be pre-cut to a desired shape before or after lamination. Further, subsections of the flosser can be formed and cut to shape and then later laminated or otherwise connected together in a further laminating or assembly step (e.g., after a filament is added to the flosser device).

The thickness, number and arrangement of bio-plastic layers may be varied to achieve different performance characteristics. For example, the use of bio-plastic layers on the outside surfaces of the flosser may increase the useful life of the product and improve usability. In other embodiments, paper layers may be positioned on the outside surfaces of the flossers so as to accelerate the delamination process and biodegradability of the flosser after its useful life ends. In still others, the outside layers may be a mix of plastic and paper layers to take partial advantage of the properties of each material. Some embodiments include the use of more bio-plastic layers than paper layers, which may increase the stiffness of the flosser.

The flosser may include a sealant that is applied to exposed surfaces of the flosser to protect the flosser from short-term exposure to moisture such as, in some examples, in a flosser designed for a single-use application. In some examples, the sealant is applied to only the individual paper layers prior to combining the paper layers with the bio-plastic layers. In other embodiments, the sealant is applied to the assembled flossing apparatus, such as to whatever portion of the paper that is exposed along the exposed side edges and/or primary exposed surfaces of the flosser. The sealant may include, for example, a plant-based sealant.

The filament for the flossing apparatus may comprise any of a variety of materials. In one example, the filament comprises a worm silk material or other natural material. Other examples include a synthetic silk or a synthetic material such as polyester.

The flossing apparatus may have different shapes and sizes. For example, the flossing apparatus may have a size and shape adapted for use with a child-sized mouth. In other examples, the size and shape may be adapted for use with an adult-sized mouth and/or teeth. In some embodiments, the flossing apparatus includes a relatively flat, 2-dimensional shape. In other examples, the flossing apparatus includes contoured surfaces or features that provide a 3-dimensional shape to enhance usability of the flossing apparatus.

FIGS. 1-5 illustrate an example flossing apparatus 10 having many of the features and functions disclosed herein. The flossing apparatus 10 includes a handle assembly 12 and a filament 14 mounted thereto. The filament 14 is held by the handle assembly 12 in such a way that the filament can be manipulated by a user between and around the user's teeth while the user is holding the handle assembly 12.

The handle assembly 12 includes first, second and third composite cores 16, 18, 20. The composite cores are also shown in the partially exploded view of FIG. 2. The handle assembly 12 also includes first and second arms 22, 24. The arms 22, 24 may be defined at least in part by portions of each of the first, second and third composite cores 16, 18, 20. In some examples, fewer than all of the first, second and third composite cores 16, 18, 20 include and/or define the first and/or second arm 22, 24. In other embodiments, the handle assembly 12 includes less than all of the first, second and third composite cores 16, 18, 20. In still further embodiments, the handle assembly 12 includes more than three composite cores.

Each of the first, second and third composite cores 16, 18, 20 includes at least one biofilm layer 30 and at least one paper layer 32. This arrangement may provide for a flossing apparatus that includes a minimum of six layers total. Each of the composite cores 16, 18, 20 are shown including two or more biofilm layers 30 and two or more paper layers 32. Other embodiments may include different combinations of biofilm layers 30 and paper layers 32. The biofilm and paper layers 30, 32 may be arranged in each of the composite cores 16, 18, 20 with a paper layer 30 interposed between adjacent biofilm layers 30. Other arrangements are possible where two or more biofilm layers 30 are arranged next to each other and/or two or more paper layers 32 are arranged next to each other. In at least one example, the handle assembly 12 is structured such that a biofilm layer 30 is positioned on the exterior, outward facing sides of the handle assembly 12, which may provide additional protection, durability, etc., for the flossing apparatus 10 during its useful life. In other arrangements, one or more of the exterior services of the handle assembly 12 is defined by a paper layer 32, which may provide an advantage of accelerating delamination and/or biodegradation of the handle assembly 12 after the useful life of the flossing apparatus 10.

In some specific embodiments, the cores 16, 18, 20 of the flossing apparatus 10 may each include between about 1 and about 5 layers of bioplastic and/or between about 1 and about 5 layers of paper. In some, the cores 16, 18, 20 may have asymmetrical construction, having layers of bioplastic (or equivalent) on the outside, or in others, having paper on the outsides of the cores 16, 18, 20. In some versions, each core's construction may be independently selected from the others, allowing for each core to have a different configuration.

In some specific examples, the cores placed to the outside of the flossing apparatus 10 may have identical or similar construction. In some such, the cores placed to the outside of the flossing apparatus, such as 18 and 20 of FIG. 2, may have an odd number of layers of bioplastic (or equivalent) and an even number of paper layers. In others, the opposite may be the case, i.e., an odd number of layers of paper may be used, and an even number of layers of bioplastic. In some specific embodiment using an odd number of layers of bioplastic, the cores placed to the outside of the flossing apparatus, such as 18 and 20 of FIG. 2, have external layers of bioplastic and internal layers of bioplastic. In some such flossing apparatus, the internal core, such as 16, may have more or less layers than the external layers, such as cores 18 and 20 described above. Similarly, the internal core, such as 16, may have odd or even numbers of paper and/or bioplastic layers, as described with respect to external cores such as 18 and 20 above. In some specific embodiments, the internal core, such as 16, may have externally facing bioplastic layers which would interface with the external cores such as 18 and 20. In some specific embodiments, each of the cores (such as 16, 18 and 20) have externally facing bioplastic layers.

Figure 2:
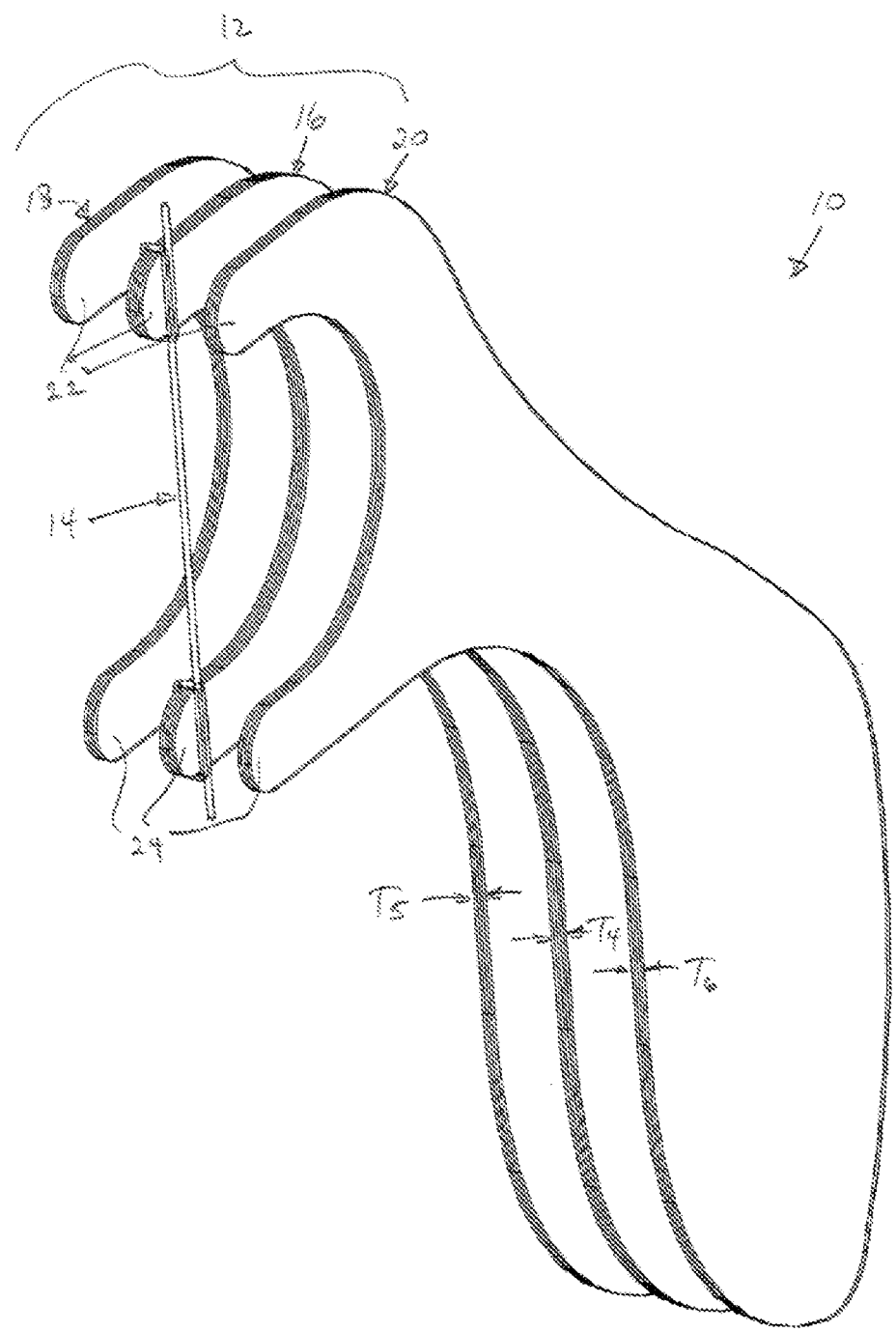
FIG. 2 is a partially exploded perspective view of the flossing apparatus shown in FIG. 1.

In some such specific embodiments of the flossing apparatus, the internal core, such as 16 of FIG. 2, may differ in construction from the cores placed to the outside of the flossing apparatus. In some such embodiments, the internal core such as 16, may be larger, or alternatively, thinner than the external cores, having either more or fewer layers than the external cores. The biofilm layers 30 may comprise a biodegrading additive. The biodegrading additive may create mechanisms in plastics that allow the plastic to be degraded or digested by microorganisms, including bacteria, both directly and indirectly. In one example, the biofilm layers 30 include at least one of polybutylene succinate (PBS) bioplastic or a polylactic acid (PLA) bioplastic. PBS is a plastic derived from Cassava and other plants. Many other types of bioplastic and biodegrading additives may be used for the biofilm layer 30. In yet other embodiments, a starch material may be used in addition to, or in place of the biofilm/bio-plastic components/layers of the flossing apparatus of the invention. Suitable organic and/or plant-based starch products may be suitable for use in place of the bioplastic/biofilms. In some examples, a non-woven starch sheet may be used to replace the bioplastic/biofilm layer(s), either completely, or partially, in the composition of the flossing apparatus according to this disclosure.

In yet other alternatives, an adhesive, such as in some examples, a spray adhesive, may be used in addition to, or in place of the biofilm/bio-plastic components/layers of the flossing apparatus of the invention. In such embodiments, application of the spray adhesive to the paper layers may take the place of lamination, sheet lamination, or other techniques used to assemble the paper layers with biofilm/bioplastic disclosed herein.

Typically, the biofilm layer 30 comprises a plastic material that can be consumed, penetrated, and/or broken down over time by exposure to moisture and/or bacteria or other organisms. Exposure of the biofilm layer 32 to such conditions (i.e., moisture, bacteria or other organisms) helps accelerate the biodegrading of the flossing apparatus 10. As such, it may be desirable to delaminate the paper layer 32 from the biofilm layer 30 as quickly as possible after completion of the useful life of the flossing apparatus 10. The delamination process may be dependent on a number of factors including, for example, the method or other means used to connect the layers 30, 32 together and connect the composite cores 16, 18 together, the materials used for the layers 30, 32, the thickness of the layers 30, 32, and the shape and/or size of the flossing apparatus 10.

The materials for the paper layer 32 may comprise any desired type of paper, paper weight, and thickness. In at least some examples, the paper layer 32 comprises, at least in part, a post-consumer recycled paper. In others, the paper layer 32 is made completely or nearly completely of post-consumer recycled paper. In at least some examples, the use of thicker, lower density paper allows the paper to delaminate more quickly, while maintaining a reasonable stiffness and strength, also lowering the amount of material used in general. In some embodiments, the paper layers may be thicker than the bioplastic (or equivalent) layers to make the composition of the flossing apparatus more paper than bioplastic. In others, the opposite is true, and the flossing apparatus is composed of more bioplastic than paper.

Any of the individual layers 30, 32, the individual composite cores 16, 18, 20, or the handle assembly 12 generally may be covered with a sealant. The sealant may resist damage to or degradation of the material of a handle assembly 12 prior to completion of the useful life of the flossing apparatus 10. The sealant may comprise a plant-based sealant. One example of a plant-based sealant is a non-GMO food grade protein that is dissolved in a food grade ethyl-alcohol (e.g., Everclear) and distilled water. The use of a plant-based sealant may have advantages related to protecting the material of the handle assembly 12 during the useful life of the flossing apparatus 10, and then degrading relatively quickly later after exposure to environmental conditions after the useful life is over. An alternative to using a sealant is to use a layer of bio-plastic film as the outer layers of the handle assembly 12, which would provide protection for at least the primary surfaces of the paper layers.

The handle assembly 12 may have a total thickness $T_1$ as shown in FIG. 1. The thickness $T_1$ may be in the range of about 0.005 inch to about 0.2 inch, and more particular about 0.03 inch to about 0.08 inch. The thickness $T_1$ may be a maximum thickness of a handle assembly 12. The maximum thickness may also be the minimum thickness when the handle assembly 12 is formed in a generally two-dimensional shape using a plurality of flat, planar individual layers 30, 32 that are laminated together as shown in the figures. In other embodiments, the handle assembly 12 may have a more 3-dimensional shape, wherein some of the layers 30, 32 may have a variable thickness or one or more of the composite cores 16, 18, 20 has a variable thickness across its width or length. The 3-dimensional shape may be provided by forming 3-dimensional shapes in the laminate or layer of the laminate structure of the handle assembly.

Figure 5:
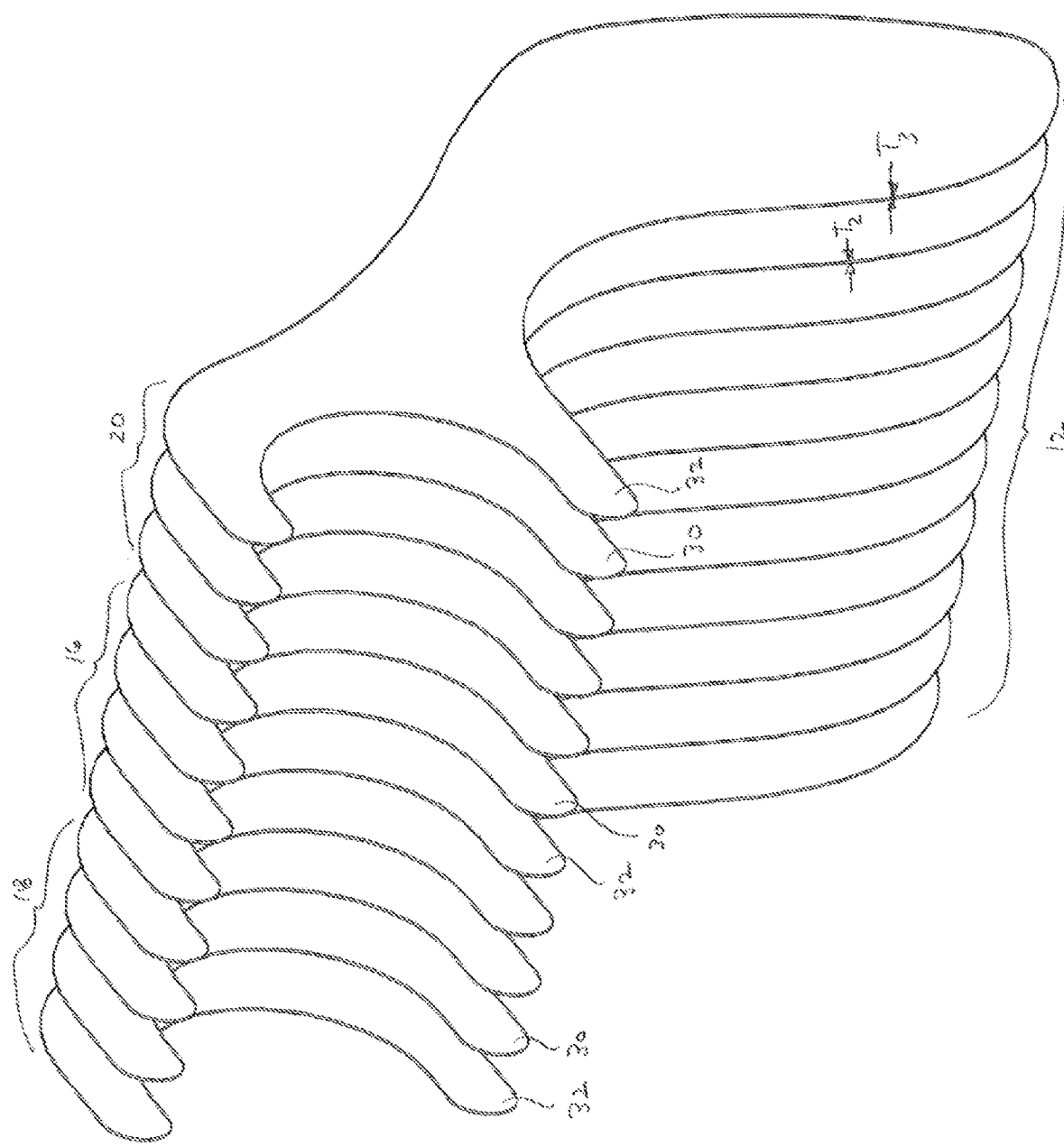
FIG. 5 is an exploded perspective view of at least some of the biofilm and paper layers of the handle assembly of the flossing apparatus shown in FIG. 1.

The biofilm layer 30 may have a thickness $T_2$ and the paper layer 32 may have a thickness $T_3$, as also shown in FIG. 5. The composite cores 16, 18, 20 may have thicknesses $T_4$, $T_5$, $T_6$, respectively, as shown in FIG. 2. In at least one embodiment, the thicknesses $T_2$ and $T_3$ are substantially equal. In other embodiments, the thickness $T_3$ is greater than the thickness $T_2$, such as about twice as thick as the layer $T_2$. In some embodiments, the thickness $T_4$ is substantially greater than the thicknesses $T_5$, $T_6$, such as about twice as thick as the thicknesses $T_5$, $T_6$. The thicknesses $T_5$, $T_6$ may be substantially equal. In other embodiments, each of the thicknesses $T_4$, $T_5$, $T_6$ are different. Typically, the thickness $T_4$ is sufficiently great, in combination with other parameters such as the materials of the layers 30, 32 and the laminate process used to connect the layers 30, 32, to provide enough strength in the arms 22, 24 to support the filament 14 in tension.

In one example, the thicknesses $T_2$, $T_3$ are each in the range of about 0.001 to about 0.05 inches. The thicknesses $T_4$, $T_5$ and $T_6$ is typically in about the range of about 0.005 to about 0.1 inches.

The handle assembly 12 has a length L as shown in FIG. 1. The length L typically is in the range of about 2 inches to about 5 inches, and more particularly about 3 inches. The length L may vary between adult size and child sized embodiments. The handle assembly 12 may have a contoured peripheral shape along its length as shown in FIG. 1. The contours may provide surfaces along the perimeter edges of the handle assembly 12 that promote grasping by the user's fingers and/or thumb. The handle assembly 12 may have a shape that promotes insertion of the flossing apparatus 10 into a user's mouth and positioning of the filament 14 between the user's teeth while a portion of a handle assembly 12 extends out of the user's mouth for grasping by the user to manipulate the filament 14 between the user's teeth.

The first and second arms 22, 24 of the handle assembly 12 are spaced apart a distance shown as gap G in FIG. 1. The gap G is sufficiently great that an exposed portion of the filament 14 can extend between and/or around portions of the user's teeth. The gap G may be in the range of about 0.2 inch to about 1 inch, and more particularly in the range of about 0.5 inch to about 0.625 inch. The gap G typically is great enough to permit some back-and-forth motion of the filament 14 while being positioned between adjacent teeth. The free ends of the first and second arms 22, 24 may be contoured or otherwise shaped so as to promote easier insertion into the user's mouth and manipulation of the flossing apparatus 10 while flossing.

Figure 3:
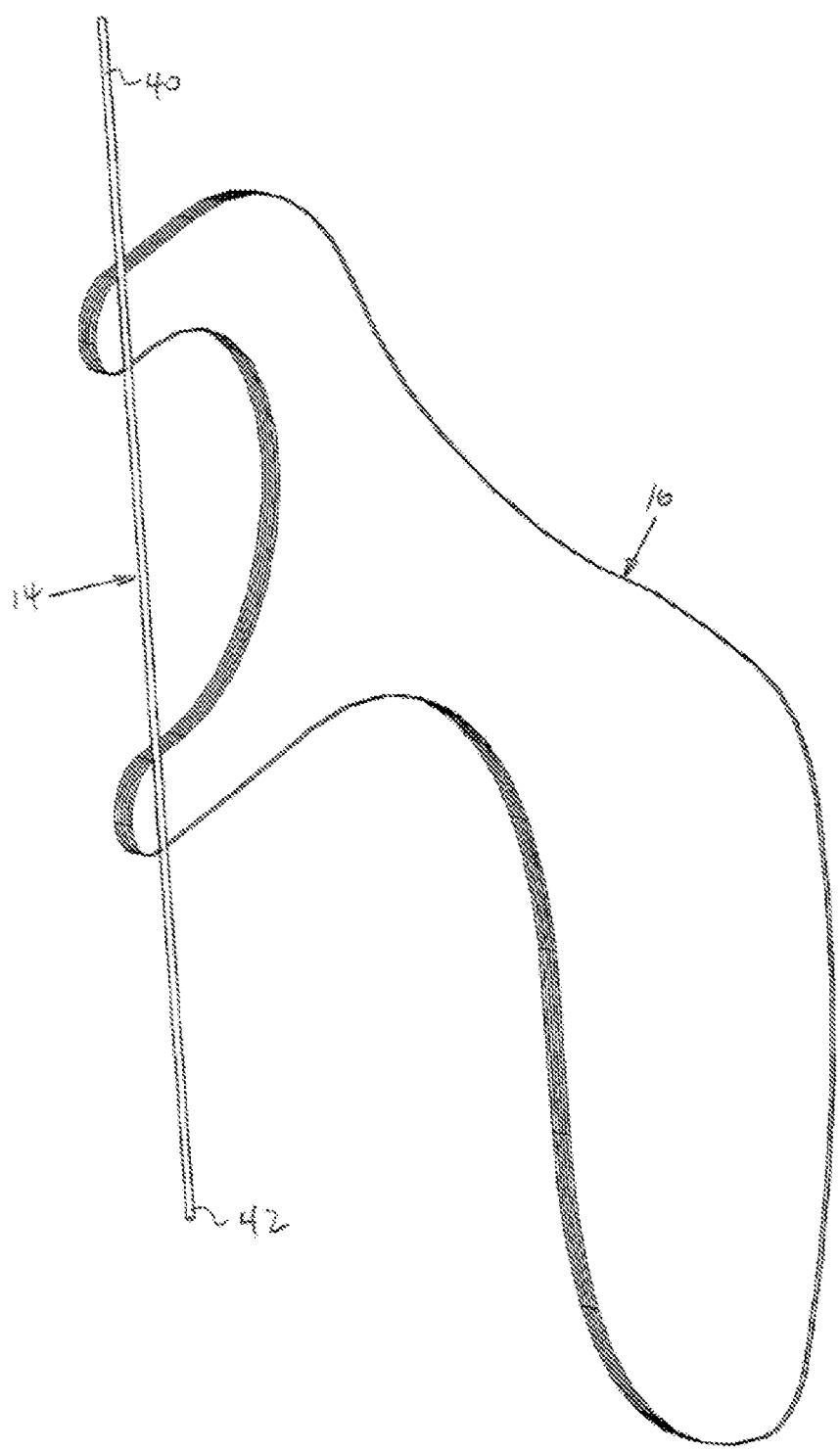
FIG. 3 is a perspective view of a first composite core and filament of the flossing apparatus shown in FIG. 1.
Figure 4:
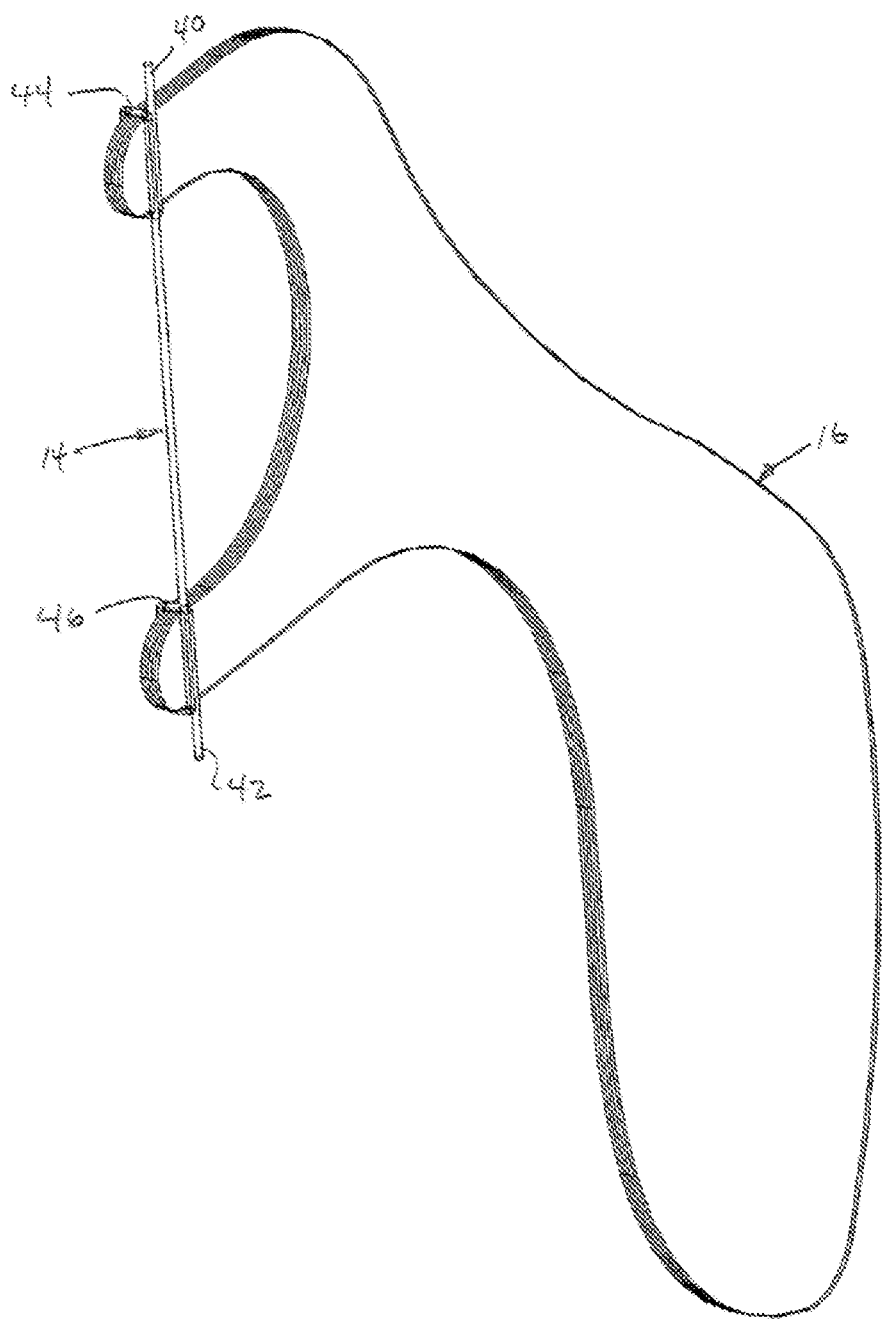
FIG. 4 is a perspective view showing the filament shown in FIG. 3 wrapped around arm members of the first composite core.

FIGS. 3 and 4 illustrate steps associated with mounting the filament 14 to the first and second arms 22, 24. Typically, the filament 14 is laid across one side of the first composite core 16 and extending across the first and second arms 22, 24. Free ends 40, 42 of the filament 14 extend beyond the first and second arms 22, 24 in opposite directions. The free ends 40, 42 are then wrapped around respective first and second arms 22, 24, as shown in FIG. 4. The wrapping around of the ends 40, 42 may be done sequentially or concurrently. Typically, the filament 14 is held in tension during the wrapping and/or pulled into tension after completion of the wrapping around each of the first and second arms 22, 24. FIG. 4 shows first and second wrapped portions 44, 46 of the filament 14 around the first and second arms 22, 24, respectively, a full wrap. Other embodiments may include a partial wrapping of the filament 14 around the first and second arms 22, 24, or more than a single full wrap around the first and second arms 22, 24 by the filament 14.

In various embodiments of the apparatus, the filament 14 may be attached/mounted to the first and second arms 22, 24 in a variety of ways. It may be attached to both arms 22, 24 in the same or different ways. In some, the filament 14 may be affixed simply by adhesion between the cores of the apparatus. In others, an adhesive may be used to tack or affix the filament 14 in place to either or both arms. In yet others, the filament 14 may be wrapped incompletely around either or both of the arms 22, 24. In others, the filament 14 may be wrapped around each arm 22, 24 a single time. In yet other versions, the filament 14 may be wrapped around each arm more than once, such as 2, 3, 4, 5, 6, 7, 8, 9, 10 or more times. In some such embodiments, the filament 14 may be adhered/tacked in place with an adhesive in addition to being wrapped around the arms 22, 24.

The filament 14 may be maintained in the position shown in FIG. 4 during the process of securing one or both of the second and third composite cores 18, 20 to the first composite core 16. The filament 14 may be held in place with the wrapped portions 44, 46 remaining tightly secured to the first and second arms 22, 24 using, for example, a bonding agent. In other examples, the filament 14 may be tacked in place using a bonding agent before wrapping around the first and second arms 22, 24. In other embodiments, the filament 14 is not wrapped around one or both of the first and second arms 22, 24. The filament 14 may be held in place relative to the first composite core 16 solely by a bonding agent or a mechanical anchor. Tacking the filament 14 in place in this way may facilitate less complex tooling otherwise needed to wind and tension the filament 14 during further assembly steps. In other embodiments, the filament 14 is maintained extending across the first and second arms 22, 24 as shown in FIG. 3 by connecting one or both of the second and third composite cores 18, 20 to the first composite core 16.

The process of securing the second and/or third composite cores 18, 20 to the first composite core 16 may include a laminating process or other method or step that provides a connection therebetween. This connection may secure the filament 14 to the first composite core 16 and/or to the handle assembly 12 generally. The securing of the second and/or third composite cores 18, 20 to the first composite core 16 may include concurrently mounting the filament 14 to the handle assembly 12. Other processes, methods and/or materials may be used to secure the filament 14 to the handle assembly 12. The filament 14 could be wound in opposite directions or diagonally across one or more of the composite cores 16, 18, 20.

In some embodiments, the filament 14 may be at least partially secured when the core 16 has external layers made of bio-film/bio-plastic, and cores 18, 20 have faces/layers abutting the internal core 16 which are made of bio-plastic/bio-film which can act as an adhesive as the cores 16, 18, 20 are laminated together, encapsulating the filament 14 and adhering it in place. This could further secure the filament 14 in place. In some instances, this may reduce the number of wraps required to secure the filament to the arms 22, 24. In others, it may obviate the need to wrap the filament 14 at all. In yet others, it may be used in addition to a sufficient number of wraps to simply provide a very secure attachment of the filament 14 to the arms 22, 24.

The excess portions of the filament 14 that remain after assembling the first, second and third composite cores 16, 18, 20 may be trimmed to reduce discomfort for the user.

Figure 6:
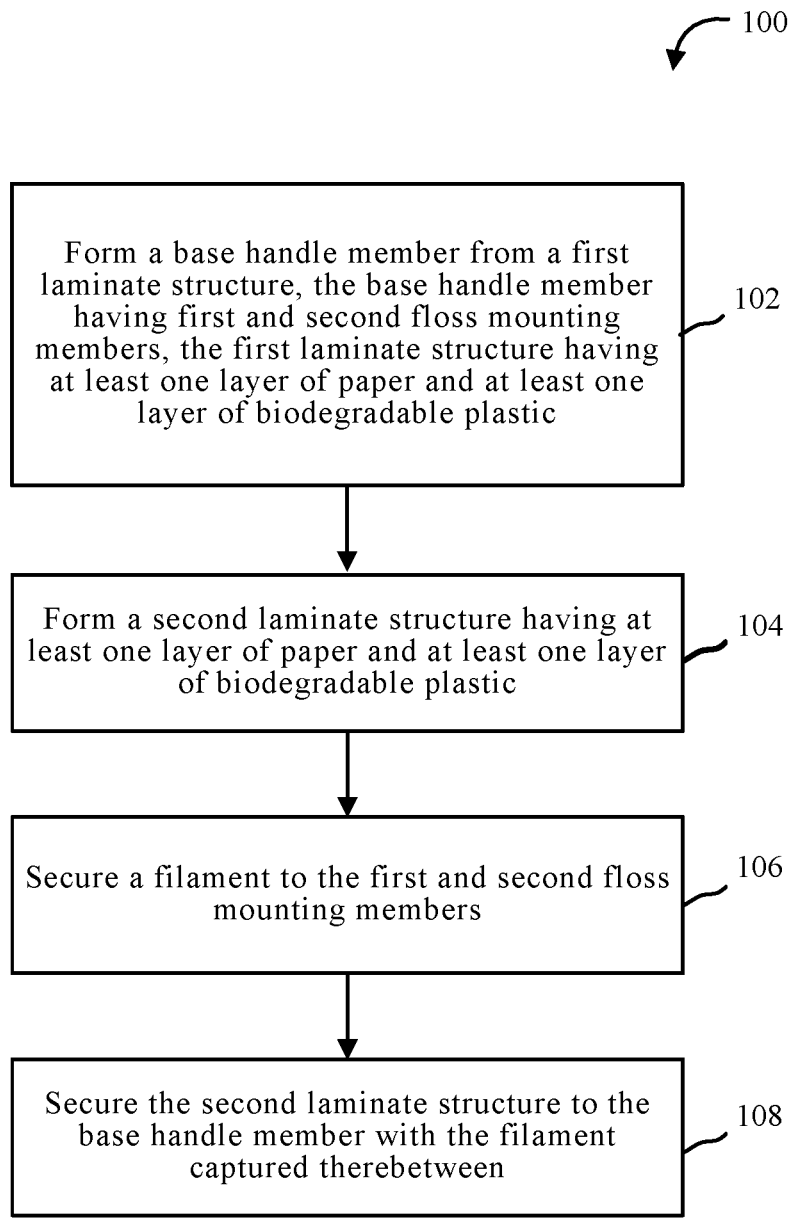
FIG. 6 is a flow diagram showing steps of an exemplary method of making a flossing apparatus in accordance with the present disclosure.

FIG. 6 illustrates steps of an example method 100 of making a flossing apparatus. The method 100 include, at block 102, a step of forming a base handle member from a first laminate structure. The base handle member includes first and second arms, and the first laminate structure has at least one layer of paper and at least one layer of biodegradable plastic. Block 104 includes the step of forming a second laminate structure having at least one layer of paper and at least one layer of biodegradable plastic. Block 106 includes the step of securing a filament to the first and second arms. The method 100 further includes, at block 108, the step of securing the second laminate structure to the base handle member with the filament captured therebetween.

The method 100 may also include applying a sealant such as a plant-based sealant to one or both of the base handle member and the second laminate structure. Securing the filament may include maintaining the filament in tension when secured to the first and second arms. Forming the second laminate structure may include cutting the second laminate structure into a predetermined shape having a profile that matches a profile of the base handle member. Forming the base handle member may include cutting the base handle member from the first laminate structure. Additional steps of the method are possible based on the disclosure set forth above.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C).

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A flossing apparatus comprising:
    (1) a handle assembly, comprising:
        (a) a first composite core and a second composite core, wherein the first composite core has at least one paper layer and at least one biodegradable plastic layers; the second composite core has at least one paper layer and at least one biodegradable plastic layer; and the first composite core is secured to the second composite core; and
        (b) a first arm and a second arm that are each defined at least in part by portions of the first composite core and portions of the second composite core; and
    (2) a filament that is both wrapped around a first portion of the first composite core that defines the first arm and wrapped around a second portion of the first composite core that defines the second arm such that the filament is both mounted to the first arm and the second arm and captured between the first composite core and the second composite core.

2. The flossing apparatus of claim 1, wherein the at least one paper layer of the first and/or second composite cores comprises recycled paper.

3. The flossing apparatus of claim 1, wherein the biodegradable plastic layer of the first and/or second composite cores comprises at least one of polylactic acid (PLA), polybutylene adipate terephthalate (PBAT), polybutylene succinate (PBS), poly-3-hydroxybutyrate (PHB) bioplastic or other suitable bioplastic.

4. The flossing apparatus of claim 1, wherein the biodegradable plastic layer of the first and/or second composite cores comprises a biodegrading additive.

5. The flossing apparatus of claim 1, wherein the first composite core has a thickness in the range of from about 0.005 inch to about 0.1 inch and the second composite core has a thickness in the range of from about 0.005 inch to about 0.1 inch.

6. The flossing apparatus of claim 1, wherein the first composite core has at least 2 paper layers and at least 2 biodegradable plastic layers, and the second composite core comprises at least 2 paper layers and at least 2 biodegradable plastic layers.

7. The flossing apparatus of claim 1, wherein:
    the handle assembly further comprises a third composite core having at least one paper layer and at least one biodegradable plastic layer;
    the first composite core is secured to the third composite core; and
    the filament is captured between the first composite core and the third composite core.

8. The flossing apparatus of claim 1, wherein the handle assembly further comprises a plant-based sealant.

9. The flossing apparatus of claim 1, wherein the filament comprises a biodegradable material.

10. The flossing apparatus of claim 1, wherein the filament comprises recycled material or naturally derived material.

11. The flossing apparatus of claim 1, wherein the handle assembly has a maximum length in the range of from about 2.5 inches to about 4 inches.

12. The flossing apparatus of claim 1, wherein the filament is held in tension on the handle assembly.

13. The flossing apparatus of claim 1, wherein the filament is adhered in place with an adhesive in addition to being wrapped around both the first portion of the first composite core that defines the first arm and the second portion of the first composite core that defines the second arm.

14. The flossing apparatus of claim 1, wherein:
the handle assembly is a laminate that comprises the paper layers and the biodegradable plastic layers of the first composite core and the second composite core; and
the filament is captured between the first composite core and the second composite core such that the filament is captured between layers of the laminate.

15. A flossing apparatus comprising:
(1) a handle assembly comprising:
(a) a first composite core, a second composite core, and a third composite core, wherein each composite core has at least one paper layer and at least one biodegradable plastic layer; and the second composite core is secured between the first composite core and the third composite core; and
(b) each core including a first arm and a second arm that are each defined at least in part by portions of the first composite core, portions of the second composite core, and portions of the third composite core; and
(2) a filament that is wrapped around a first portion of the second composite core that defines the first arm and around a second portion of the second composite core that defines the second arm such that the filament is both mounted to the first arm and the second arm and captured between the first composite core and the third composite core.

16. The flossing apparatus of claim 15, wherein the filament is adhered in place with an adhesive in addition to being wrapped around both the first portion of the second composite core that defines the first arm and the second portion of the second composite core that defines the second arm.

17. The flossing apparatus of claim 15, wherein:
the filament is captured between the first composite core and the second composite core such that the filament contacts both a layer of the first composite core and a layer of the second composite core;
the filament is captured between the second composite core and the third composite core such that the filament contacts both a layer of the second composite core and a layer of the third composite core;
the handle assembly is a laminate that comprises the paper layers and the biodegradable plastic layers of the first composite core, the second composite core, and the third composite core;
the second composite core is an internal core of the laminate, and the first composite core and the third composite core are both external cores of the laminate; and
the filament is captured because the filament is wrapped around the internal core of the laminate.

18. The flowing flossing apparatus of claim 15, wherein: the filament is captured between the first composite core and the second composite core such that the filament contacts both a layer of the first composite core and a layer of the second composite core; the filament is captured between the second composite core and the third composite core such that the filament contacts both a layer of the second composite core and a layer of the third composite core; the handle assembly is a laminate that comprises the paper layers and the biodegradable plastic layers of the first composite core, the second composite core, and the third composite core; the second composite core is an internal core of the laminate, and the first composite core and the third composite core are both external cores of the laminate; the filament is captured because the filament is wrapped around the internal core of the laminate; and the filament is adhered in place with an adhesive in addition to being wrapped around both the first portion of the second composite core that defines the first arm and the second portion of the second composite core that defines the second arm.

* * * * *